United States Patent [19]

Dovnar et al.

[11] 4,177,699

[45] Dec. 11, 1979

[54] METHOD OF MACHINING END FACES

[76] Inventors: Stanislav A. Dovnar, ulitsa Koltsova, 18/1, kv. 79; Valery A. Sidorenko, Leninsky prospekt, 14, kv. 3; Evgeny I. Morgunsky, ulitsa Malaya, 15, kv. 1; Nikolai V. Vishnev, ulitsa Karastoyanovoi, 23, kv. 82, all of Minsk, U.S.S.R.

[21] Appl. No.: 917,579

[22] Filed: Jun. 21, 1978

[51] Int. Cl.² ............................ B23B 3/00; B23C 1/00
[52] U.S. Cl. ...................... 82/1 C; 409/132; 409/166
[58] Field of Search ...................... 407/7; 82/1 C, 2 A; 90/11 C

[56] References Cited

U.S. PATENT DOCUMENTS

| 2,127,523 | 8/1938 | Kraus | 82/1 C |
| 3,155,008 | 11/1964 | Sporck | 82/1 C |
| 3,741,070 | 6/1973 | Berthiez | 90/11 C |

*Primary Examiner*—Harrison L. Hinson
*Attorney, Agent, or Firm*—Robert E. Burns; Emmanuel J. Lobato; Bruce L. Adams

[57] ABSTRACT

The invention relates to methods of machining end faces with rotary tools. The method according to the invention comprises imparting to the workpiece a rotary motion and to the tool—a straight feed motion at an angle 20°–75° to the radius of the workpiece.

1 Claim, 2 Drawing Figures

METHOD OF MACHINING END FACES

FIELD OF THE INVENTION

The invention relates to methods of machining end faces with rotary tools.

The invention may be most advantageously used in the mechanical engineering, aircraft, shipbuilding and other industries for sizing and finishing machining of end faces preferably of ring-shaped workpieces manufactured of ductile hard-to-machine materials having a tendency to intense excrescence formation during cutting which materially reduces quality and accuracy of machining.

BACKGROUNDS OF THE INVENTION

Metal cutting is a leading technique in the mechanical engineering which is due to its wide capabilities of ensuring minimum possible cycle of preparation to the production of structurally intricate workpieces, low power requirements and big savings in performing complicate and labour-consuming finishing operations. The main problem of the development of the cutting technique is associated with an improvement of its productivity with concurrent meeting of high requirements imposed on accuracy and quality of machining of surfaces. The importance of the problem become greater due to a widespread application in the technology of new hard-to-machine materials making the machining performance 10–25 times lower than in cutting carbon and alloyed structural steel.

Known methods aimed at improving the performance of cutting, accuracy and quality of finished surfaces which are based on improvement of construction and optimization of geometrical parameters of cutting portion of known tools, improvement of quality of their working surfaces, application of new types of coolants and special machining methods, such as superhigh speed cutting with heating or deep cooling of a tool or a workpiece are either rather complicated and labour-consuming or insufficiently effective.

At the same time, an important reserve for an expansion of production capabilities of cutting rests with methods of rotary cutting in which additional rotation is imparted to circular cutting edges of a tool about its axis. This is ensured by appropriately positioning the tool relative surface to be machined.

With the rotary cutting, due to an additional rotation of the cutting edges of the tool, the sliding speed of the working surfaces of the tool relative to the material being machined is lowered by 1.5–3 times in comparison with the known methods. Furthermore, the length of the active portion of the cutting edge is increased and the time of contact of each point of the cutting blade with the material being machined is reduced by scores of times, respectively. The combination of the above advantages ensures a multiple increase in the tool life, hence improves productivity, accuracy and quality of machining.

Alongside the above advantages of the rotary cutting, this method exhibits a disadvantage of low immunity to vibrations. This limits the possibilities of the method as regards the provision of high accuracy and quality of machining.

STATE OF THE ART

Known in the art is a method for rotary cutting disclosed in USSR Inventor's Certificate No. 428864 of Feb. 6, 1973, wherein the axis of rotary circular edges of a tool is at 15°–35° to the base plane. Due to a reduction of the length of contact of the cutting edge with the workpiece being machined, cutting forces decrease, the speed of tool rotation stabilizes thus enabling the reduction of likelihood of appearance of vibrations during cutting and associated lower quality and accuracy of machining.

Another way of improving the immunity of the cutting method to vibrations is associated with pre-loading of the tool by forces compensating for the effect of cutting forces on deformation of elements of the tool. Known in the art is a method for rotary cutting disclosed in USSR Inventor's Certificate No. 536886 of Feb. 11, 1975, wherein the rotary portion of a rotary tool is pre-loaded by forces close in magnitude and opposite in direction to the cutting forces. The method enables an improvement of immunity of the cutting process to vibrations, hence accuracy and quality of machining.

Known in the art is a method of machining end faces with rotary tools, wherein a rotary motion is imparted to a work-piece and a straight feed motion is imparted to the tool radially of the workpiece.

The use of conventional rotary cutting methods for machining end faces is insufficiently effective as regards high quality and accuracy of the machining as the process is effected at varying actual cutting speed. This is inevitably reflected on the nature of phenomena occurring in zones of contact of the working surfaces of the tool and material being machined. As a result, the cutting process is accompanied by a continuous fluctuation of friction forces and coefficient of friction, chip shrinkage, relaive shear, cutting forces and temperature, intensity of wear of the cutting edge, size and shape of excrescence formed thereon and the like. This results, during the machining, in variation of quality and accuracy parameters (shape and height of micro-irregularities, degree and depth of surface plastic deformation, value and nature of distribution of residual stresses, the size of bearing surface, reflective power and the like). Therefore, certain portions of the machined surface have different quality of machining, differ in accuracy, geometrical shape and dimensions, hence in operating performance.

BRIEF DESCRIPTION OF THE INVENTION

It is a general object of the invention to provide a method of machining end faces with rotary tools which enables an improvement of quality of machining.

Another object of the invention is to provide a method of machining end faces with rotary tools which enables high quality of machining.

Still another object of the invention is to provide a method of machining end faces which enables stabilization of actual cutting speed during the entire machining cycle.

In accordance with these and other objects, the invention consists in that a method of machining end faces with rotary tools comprises imparting a rotary motion to work-piece and imparting a straight feed motion to the tool radially of the workpiece, which feed motion, according to the invention is effected at 20°–75° to the workpiece radius.

Due to the face that the tool is fed at 20°–75° to the workpiece radius, actual cutting speed is stabilized during the entire machining cycle, which contributes to an improvement of quality and accuracy of machined surfaces.

The selection of an angle of the feed motion within the above-specified limits is explained by the following considerations. As a result of the displacement of the tool at an angle to the radius of the workpiece it takes place continuous variation of positioning of its cutting edge relative to the direction of the vector of rotary speed of the workpiece at an apex of the tool. The angle of positioning of the tool relative to the above-mentioned vector which is a complementary angle to 90° for the motion angle also changes. Minimum value of the positioning angle is limited by the stability of the tool rotation during machining and is 15°. Therefore, the feed motion angle is 90°−15°=75°.

With positioning angles of the tool exceeding 70° incomplete separation of chip from the base material occurs. This is accompanied by a material increase in forces applied to the tool, and vibrations appear which result in an intense chipping of the cutting edge and impaired accuracy and quality of machining. Thus, the lower limit of the feed motion angle is 90°−70°=20°.

These and other objects and advantages of the invention will become apparent from the following detailed description of an embodiment thereof with reference to the accompanying drawings, in which:

FIG. 1 diagrammatically shows the relative position of a rotary tool and a ring-shaped workpiece;

FIG. 2 is a sectional view taken along the line II—II in FIG. 1.

DETAILED DESCRIPTION OF THE INVENTION

Figure 1:
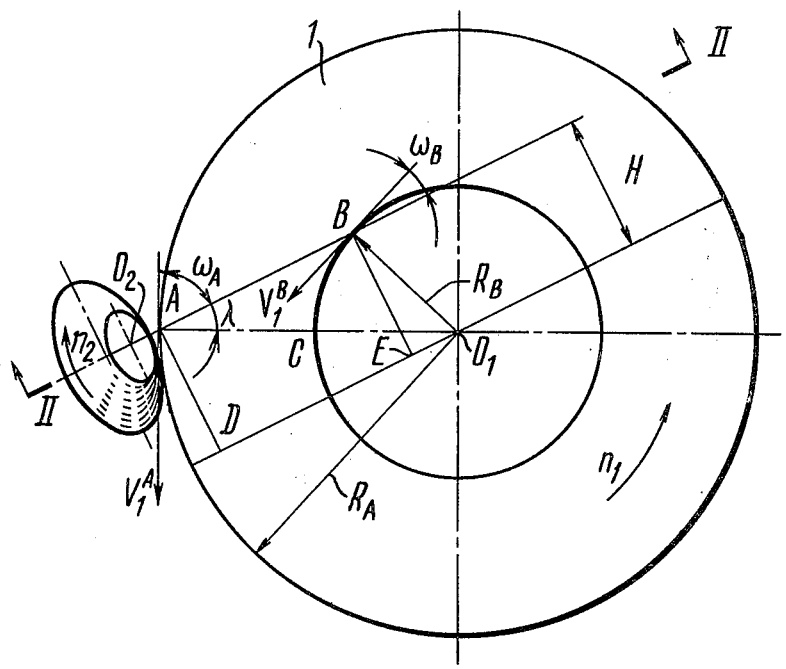
Figure 2:
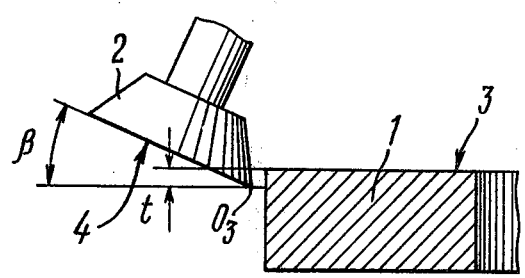

According to the invention, it is contemplated a method of machining end faces with rotary tools in which a rotary motion is imparted at a speed $n_1$ to a workpiece 1 being machined (FIG. 1) about its geometrical axis $O_1$ this motion being the main motion. A tool 2 is mounted relative to a machined surface 3 (FIG. 2) of the workpiece 1 in such a manner that the plane of its cutting edge 4 is at angle $\beta$ to the machined surface 3. The value of the angle is varied within 5°–45° depending on ratios of workpiece dimensions and requirements to roughness of machined surface. Rotation of the tool 2 about its axis $O_2$ is effected due to its engagement with the workpiece 1 ($n_2$ is rotary speed of the tool). To ensure stability of this rotary motion, the plane of inclination of the axis $O_2$ of the tool 2 is turned at points A and B (FIG. 1) relative to vectors $V_1^A$ and $V_2^B$ of the main motion at angles $\omega_A$ and $\omega_B$, respectively.

It is known that actual cutting speed V is equal to the sliding speed of the clearance face of the tool 2 relative to the machined workpiece 1, and in cutting with a rotary tool, this speed is $$V = \epsilon V_1, \quad (1)$$

wherein $V_1$ is rotary speed of the workpiece,
$\epsilon < 1$ is speed factor.

With steady rotation of the tool and with low ratios t/d (t is cutting depth, d is diameter of the cutting portion), the tool automatically gains the performance with minimum friction speeds at the clearance face, and in such case the formula $$\epsilon = \cos\omega \quad (2)$$

is true with an error less than 5% and wherein $\omega$ is an angle between the plane of inclination of axis $O_2$ of the tool 2 relative to the vector of the main motion of the tool at an apex $O_3$ (FIG. 2) of the tool (more exactly of its cutting edge corresponding to the maximum introduction into the material to be treated.

It has been found that, to provide for constant actual cutting speeds at all points of the path of relative motion of the tool 2 and machined surface 3, the tool 2 should be caused to move during the machining along a straight line AB which is at an angle $\lambda$ to the radius $AO_1$ of the workpiece 1, this angle being referred to below as the feed motion angle. Since the vectors $V_1^A$ and $V_2^B$ of the speed of the main motion at the end points A and B of the path of the straight-line motion of the tool 2 differ not only in value, but also in direction, the actual value of the positioning angle changes during the machining ($\omega_A > \omega_B$).

Let us draw a diameter in parallel with the line AB through the axis $O_1$ of rotation of the workpiece 1. Perpendiculars AD and BE are drawn through the points A and B which are located at a distance equal to radiuses $R_A$ and $R_B$ from the rotational axis of the workpiece 1, to the line AB, the perpendiculars being equal to each other (AD=BE=H).

From the triangles $ADO_1$ and $BEO_1$ it is found that $$H = R_A\cos\omega_A = R_B\cos\omega_B \quad (3)$$

The ratio of actual cutting speeds at the points A and B is $$(V^A/V^B) = (V_1^A \epsilon_A / V_1^B \epsilon_B), \quad (4)$$

wherein
$V_A$ and $V_B$ are actual cutting speeds at the points and B;
$V_1^A$ and $V_1^B$ are linear speeds of the workpiece at the points A and B;
$\epsilon_A$ and $\epsilon_B$ are speed factors at the points A and B, or using the formula (2):

$$(V^A/V^B) = (V_1^A \cos\omega_A / V_1^B \cos\omega_B) = (R_A \cos\omega_A / R_B \cos\omega_B). \quad (5)$$

Compare (3) and (5) to find that $V_A = V_B$, that is the actual cutting speed for the rotary tool 2 during its movement at an angle $\lambda$ to the radius $R_A$ of the workpiece 1 remains unchanged.

The feed motion may be effected along a stright line either between the points A and B (from the greater radius $R_A$ to the smaller radius $R_B$) or in the opposite direction, between the points B and A, which can only change the pattern of machining and direction of chip separation.

Minimum value of the positioning angle $\omega$ is limited by the stability of rotation of the tool 2 during machining and is 15°.

With angles $\omega$ exceeding 70° incomplete separation of chip from the base material occurs. Thus forces applied to the tool increase, and appear vibrations to result in an intense chipping of the cutting edge and in impaired accuracy and quality of machining.

Since the angle $\lambda$ of the feed motion is a complementary angle to 90° for the positioning angle $\omega$, and taking into account the limitations for the angle $\omega$, the range of variation of the angle $\omega$ between the feed direction and the radial direction is found to be from 20° to 75°.

With pre-set radiuses of machining $R_A$ and $R_B$, such value of the angle $\lambda$ is selected which does not deviate beyond the limits of the above-mentioned range. In practice, the machining with the feed motion at the angle λ to the radial direction is effected by shifting the point A of the tool relative to the axis $O_1$ of rotation of the workpiece by an amount H which should be within the following ranges:

$$R_A \cos \omega_A \leq H \leq R_B \cos \omega_B$$

The following examples illustrate the manner in which the method is carried out.

EXAMPLE 1

The end face of a ring-shaped workpiece having outside and inside dimensions of $R_A = 200$ mm and $R_B = 75$ mm, respectively, and height of 43 mm was machined. The material of the workpiece-low-carbon steel containing 0.2% of carbon. The machining was effected on a lathe. Machining conditions: spindle speed 250 rpm, cutting depth 0.2–0.3 mm, feed 0.7 mm/rev.

The machining was effected by means of a rotary tool in the direction from the smaller radius to the greater radius.

The shift H of the tool point relative to the rotational axis of the workpiece with minimum value of the positioning angle ω was determined:

$$H_B = R_B \cos \omega_B = 75 \cos 15° = 72.75 \text{ mm}.$$

For the end point A, with maximum value of the angle $\omega_A$:

$$H_A = R_A \cos \omega_A = 200 \cos 70° = 68.4 \text{ mm}$$

Since the values of $H_A$ and $H_B$ differed only slightly, the mean value of the shift H = 70.5 mm was chosen. Then the angle λ between the feed motion and the workpiece radius was $$\omega = \text{arc sin } (\cos \omega_B) = \text{arc sin } (H/R_B) = 70°10'.$$

After positioning the tool with the shift at the value of H relative to the center axis of the lathe, the operator put on the spindle rotation and the feed motion. The machining cycle was completed in 0.8 minutes. The height of micro-irregularities was 3–5 mcm, maximum deviation from planeness was 0.03 mm.

EXAMPLE 2

A working end face of a workpiece of the type of pressure disc for a friction clutch was machined on a vertical two-spindle semiautomatic lathe; the material was modified cast iron. Workpiece dimensions: $R_A = 132$ mm, $R_B = 56$ mm. The machining was effected beginning from the side of the greater radius.

The value of shift for the two end points A and B was determined:

$$H_A = 45.1 \text{ mm}, H_B = 54.3 \text{ mm}.$$

The mean value $H_m = 50$ mm was selected.
Then the angle λ of feed motion was $$\lambda = \text{arc sin}(H/R_A) = 22°20'.$$

Machining conditions: cutting depth—0.3 mm, feed 0.8 mm/rev, workpiece speed—600 rpm.

After the tool was positioned with a shift H, the operator clamped the workpiece in the lathe and put it on. The machining cycle was completed in 0.15 minutes. The tool life was 300 minutes of machining time. Height of microirregularities of the surface was 5–7 mcm, maximum deviation from planeness was 0.05 mm.

EXAMPLE 3

A split plane of a welded gear case of low-carbon steel containing about 0.3% of carbon was machined on a vertical turret lathe. The workpiece was clamped on the rotary table of the lathe so that maximum machining diameter was 1900 mm and minimum diameter was 1580 mm. The value of shift H was determined:

$$H_A = 1900 \cos 70° = 1900 \cdot 0.342 = 650 \text{ mm}.$$

$$H_B = 1580 \cos 15° = 1580 \cdot 0.97 = 1532 \text{ mm}.$$

Since the machining was effected in this case with the feed motion between the greater radius and the smaller radius, and due to the fact that the cutting process was of an interrupted, impact nature, minimum possible angles ω of turning of the cutting edge at the portions of the machined surface having the greater radius should be set up.

Thus $H = H_B = 1532$ mm was chosen.
Then the angle λ of the feed motion was $$\lambda = \text{arc sin } (1532/1900) = 59°40'.$$

Machining conditions: cutting depth—0.15–0.20 mm, feed —1 mm/rev., table speed —80 rpm.

Height of microirregularities of the machined surfaces was 3–8 mcm, maximum deviation from planeness was 0.04 mm over the entire length of the case.

While the preferred embodiment of the invention was described above, it will be understood that various modifications may be introduced in the drawing and the method described without deviating beyond the spirit and scope of the invention as defined by the attached claims.

We claim:
1. A method of machining end faces with rotary tools comprising the steps of:
   imparting to the workpiece a rotary motion;
   imparting to the tool a straight motion at an angle 20°–75° to the radius of the workpiece.

* * * * *